(No Model.)

J. E. WELLING.
OVEN FOR OIL OR VAPOR STOVES.

No. 358,762. Patented Mar. 1, 1887.

WITNESSES
L. Durand
Edward Stanton

John E. Welling
INVENTOR
By Louis Bagger & Co.
Attorneys

UNITED STATES PATENT OFFICE.

JOHN EDWARD WELLING, OF GEORGETOWN, KENTUCKY, ASSIGNOR OF ONE-HALF TO DAVID R. SAUNDERS, OF SAME PLACE.

OVEN FOR OIL OR VAPOR STOVES.

SPECIFICATION forming part of Letters Patent No. 358,762, dated March 1, 1887.

Application filed January 21, 1886. Serial No. 189,270. (No model.)

*To all whom it may concern:*

Be it known that I, JOHN EDWARD WELLING, a citizen of the United States, and a resident of Georgetown, in the county of Scott and State of Kentucky, have invented certain new and useful Improvements in Ovens for Oil or Vapor Stoves; and I do hereby declare that the following is a full, clear, and exact description of the invention, which will enable others skilled in the art to which it appertains to make and use the same, reference being had to the accompanying drawings, which form a part of this specification, and in which—

Figure 1:
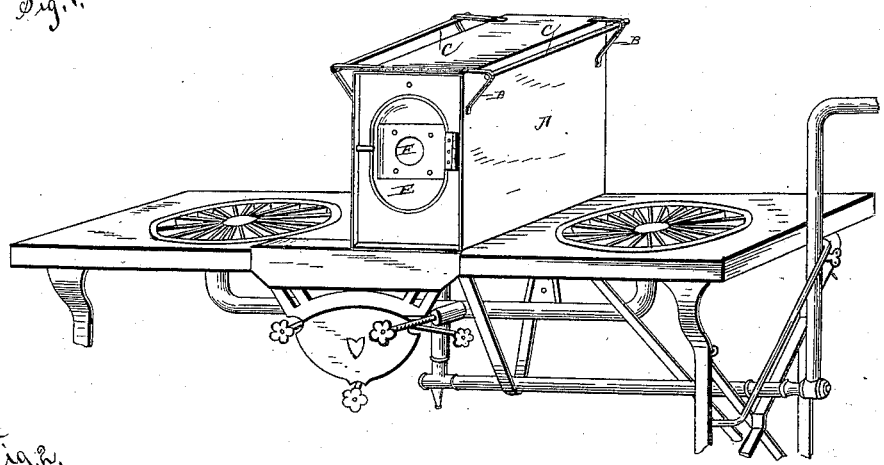
Figure 2:
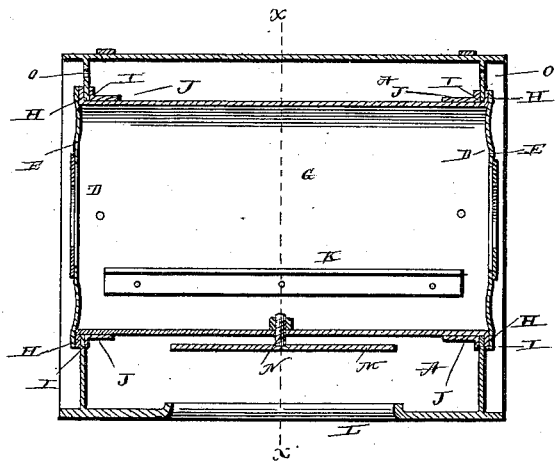
Figure 3:
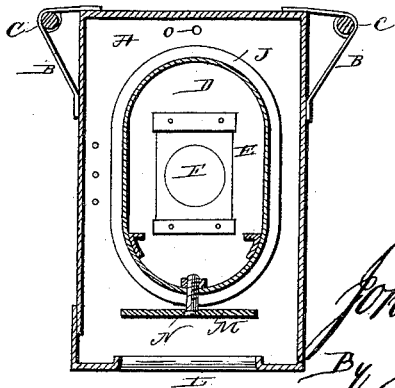

Figure 1 is a perspective view of my improved oven for oil or vapor stoves, showing it in position upon a stove. Fig. 2 is a longitudinal vertical sectional view of the same; and Fig. 3 is a cross-section on line $x\,x$, Fig. 2.

Similar letters of reference indicate corresponding parts in all the figures.

My invention has relation to that class of ovens for oil or vapor stoves in which an outer casing is provided with an aperture in its bottom which is placed over the stove, and in which the oven proper is inclosed within this casing; and it consists in the improved construction and combination of parts of such a stove, as hereinafter more fully described and claimed.

In the accompanying drawings, the letter A indicates the outer casing, which is preferably rectangular, and the upper side edges of this casing are provided with brackets B at the corners, projecting to the sides and having rods C secured in them parallel to the edges of the casing, the said rods serving as ornaments as well as for the purpose of handling the oven, forming convenient handles for moving the same. The ends of the casing are formed with oblong apertures D, which are closed by hinged doors E, provided with panes F, of mica, through which the contents of the oven may be viewed, and the ends of a tube, G, oblong in section and forming the oven proper, are bent over the edge of the door-apertures, forming flanges H, which retain the tube in place, and at the same time serve to brace the ends of the oven.

Shoulders I are formed upon the inner sides of the door-apertures by strips J, secured upon the tube and bearing against the inner sides of the edges of the door-apertures, and in this manner the ends of the casing are held firmly from within and from without, and the tube is likewise held firmly in the apertures for the doors.

The interior of the tube is provided with suitable cleats, K, for the support of shelves or pans, upon which the articles to be baked may be placed.

The bottom of the outer casing has an aperture, L, which is placed over the stove, and through which the heat from the flame of the stove may be carried around the entire oven, and a shield, M, or deflector, corresponding in size and shape to the size and shape of the aperture in the bottom, is secured at its middle, by means of a bolt, N, to the under side of the oven-tube, serving to prevent the said tube from being burned by the heat from the stove, and deflecting the heat from the said tube, preventing any one portion of the tube from becoming more heated than another.

The advantage gained by securing the deflector to the oven by its middle alone is evident, as this mode of attachment allows said deflector to expand, contract, and warp without in any degree warping that portion of the oven to which it is attached.

The bolt which secures the deflector to the tube is nutted, so that the deflector may be removed and another put in its place, the deflector being burned during use of the oven and requiring renewal occasionally.

It will be seen that, on account of the tube being inclosed within the casing and on account of the deflector being secured between the tube and the aperture in the bottom of the casing, the heat from the flame of the stove will be carried around the tube, and will cause the oven to bake as well from the top as from the bottom, the entire chamber surrounding the oven-tube, and the progress of the baking of the articles within the oven may be watched through the panes of mica in the doors without the necessity of opening the doors and letting any heat out of the oven.

The ends of the casing are preferably provided with small apertures O above the door-apertures, through which apertures the heat may escape sufficiently to continually create a current of hot air around both sides of the oven-tube and over the top of the same, as well as for the purpose of preventing an undue amount of heat accumulating within the heat-chamber around the oven.

The oven may be used with any oil-stove, vapor or gas stove, or it may even be placed over the aperture of a common stove and be used with effect, the hot-air chamber surrounding the oven-tube causing the oven to bake evenly from the top and sides as well as from the bottom.

I am aware that heretofore in ovens for oil or vapor stoves deflectors have been attached thereto in a manner such as to disperse the heat as it enters an aperture in the bottom of said oven, and I do not claim such construction, broadly; but

I claim—

In an oven for oil or vapor stoves, the combination of a rectangular casing having an aperture in its bottom, an oven-tube secured at its ends in the ends of the casing, and a shield or deflector corresponding in shape and size to the aperture in the outer casing, and removably bolted at its middle to the under side of the oven-tube above the bottom-aperture, as and for the purpose shown and set forth.

In testimony that I claim the foregoing as my own I have hereunto affixed my signature in presence of two witnesses.

JOHN EDWARD WELLING.

Witnesses:
　JNO. W. THOMPSON,
　JNO. W. SHERRITT.